Figure 1:
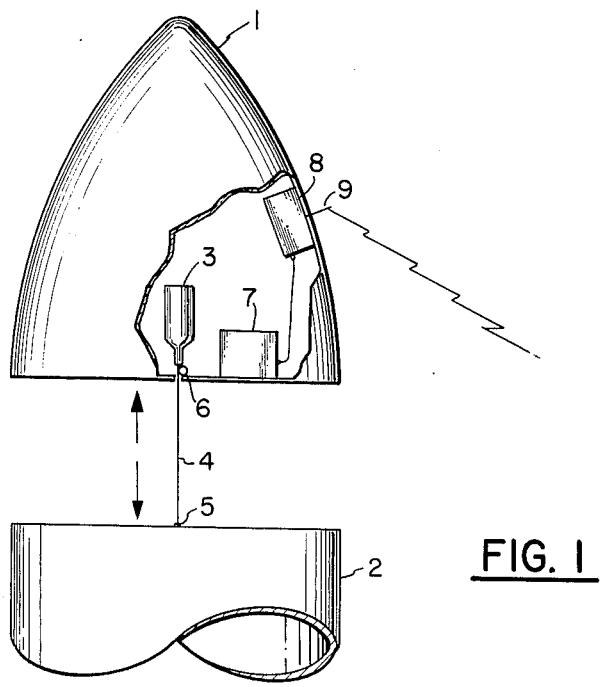

April 19, 1966    H. W. YATES    3,246,860
VELOCITY MEASURING SYSTEM
Filed Nov. 3, 1961

INVENTOR.
HAROLD YATES
BY
ATTORNEY

United States Patent Office 3,246,860
Patented Apr. 19, 1966

3,246,860
VELOCITY MEASURING SYSTEM
Harold W. Yates, Stamford, Conn., assignor to Barnes Engineering Company, Stamford, Conn., a corporation of Delaware
Filed Nov. 3, 1961, Ser. No. 150,088
4 Claims. (Cl. 244—1)

This invention relates to the velocity measuring means and programming of payload separation from a rocket body.

When a nose cone or satellite is finally separated from the rocket carrying it, or the last stage thereof, certain problems arise which have not hitherto been solved. It is with the solution of these problems that the present invention deals.

The separation from a rocket body is frequently effected by explosive bolts or similar means which give a small impetus to the two pieces of equipment so that they move apart with moderate although substantial speed. It is often desirable to determine this speed and to effect other programming functions timed to occur immediately after the separation. It is important that these functions be performed reliably and it is also desirable, particularly in the case of satellites, to maintain weight to an absolute minimum.

Essentially the present invention performs these functions by means of a recording wire or similar strong medium, one end of which is attached to the rocket body, the wire being held in a container which permits extremely rapid paying out without snarling or jerking. As the wire is paid out it passes through a playback head producing electrical signals from the prerecorded information on the wire. In the case of speed measurements this information is in the form of a continuous tone or interrupted signals at definite separations so that as the wire passes through the playback head there is produced a signal, continuous or pulsed, which is proportional to the speed at which the two objects are separating. In the case of continuous tone the speed is expressed as tone frequency. In the case of pulses it is the repetition frequency of these signals which is proportional to speed. In each case the signals produced are fed into the ordinary telemetering transmitter of the nose cone or satellite and are transmitted back to earth. When the wire has entirely paid out the loose end separates and its function is over.

The producing of signals which can be telemetered back to earth and give information as to the speed of separation of the two bodies is the most important function which is performed by the present invention. However, it is an advantage that additional functions may also be performed. For example, if it is desired to initiate certain operations in the nose cone or satellite at a predetermined interval after separation from the rocket, for example the swinging out of transmitting antennas or sometimes in the case of satellites surfaces containing solar cells, these operations must occur at a definite time or rather at a definite distance so that the presence of the rocket body does not interfere. While this has hitherto been effected by timers these timers add to the weight carried and it is an advantage of the present invention that signals to initiate such operations may also be impressed on the wire and will give off signals from the playback at the required separation distance of the rocket. This is done without adding additional weight and so makes possible performing two functions with the same single element.

Preferably a strong high tensile steel wire is used as the medium on which the electrical signals are prerecorded. This obviates any danger of breaking particularly when the wire is coiled in a form similar to that used on surf casting reels of fishing poles. It is at least theoretically possible to utilize magnetic tape with a leader of extremely high resilience such as thin rubber, unstretched nylon and the like to take up the initial acceleration as the rocket body is blown loose. With the presently available materials for magnetic tapes the strength available is marginal and the reliability is less than with a strong steel wire. However, it is still possible to use tape and with the advent in the future of stronger tapes this modification can become practical and is, therefore, included within the broad scope of the present invention although the use of a steel wire is still very strongly preferred.

Figure 2:
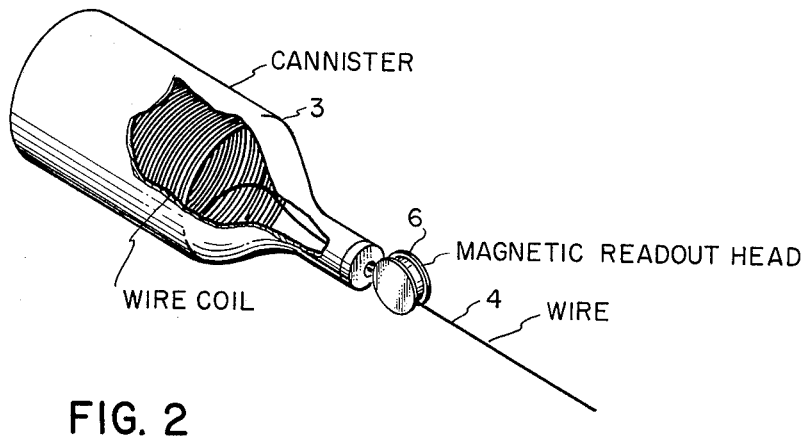

The invention will be described in greater detail in conjunction with the drawings in which:

FIG. 1 is an elevation, partly broken away, of a nose cone and rocket body at an instant shortly after separation is started, and FIG. 2 is a detailed isometric view, partly broken away, of the wire in its canister.

The nose cone is shown at 1 with the rocket body at 2 the movement apart being indicated by the two arrows. The wire 4, coiled in a canister 3 as shown in FIG. 2, is fastened at 5 to the rocket. The canister is integral with the nose cone and the wire passes through a magnetic readout at 6. Signals are prerecorded on the wire 4 to produce electric signals from the readout head which are proportional to the speed of separation of nose cone and rocket. These signals are introduced into an electronic circuit and after amplification are impressed onto the telemetering transmitter 8 which sends out a signal over the antenna 9. This signal informs the launching station of the speed of separation at different instants so that the speed of separation can be definitely known.

Where other signals to initiate or effect other functions in the nose cone are impressed on the wire these also will be transformed into electrical signals and the electronic circuit 7 suitably separates them from the speed indicating signals and connects them to other equipment on the nose cone, not shown, where they can initiate other functions in accordance with a preprogrammed sequence of recorded signals on the wire.

I claim:
1. A final stage rocket and payload assembly including rocket and payload sections, means for initiating separation of the two,
    (a) an elongated magnetic recording medium having recorded thereon a predetermined signal sequence,
    (b) said recording medium being coiled in the payload section for relatively frictionless payout and having one end attached to the rocket body,
    (c) a magnetic playout head in playout proximity to the medium whereby on said separation of the rocket and payload the recording medium passes through the playout head producing signals proportional to separation speed of payload and rocket.

2. A rocket and payload combination according to claim 1 in which the recording medium is a steel wire having predetermined signals preprogrammed thereon magnetically.

3. A rocket and payload combination according to claim 2 in which the wire is coiled in a canister to pay out without friction and snarling.

4. A payload and rocket combination according to claim 2 in which additional signals for initiating sequential operations in the payload are preprogrammed magnetically on the wire.

References Cited by the Examiner

UNITED STATES PATENTS

| | | | |
|---|---|---|---|
| 2,603,688 | 7/1952 | Cole et al. | 317—5 |
| 2,941,764 | 6/1960 | Lee et al. | 244—1 |
| 2,971,727 | 2/1961 | Haber | 244—110 |

FERGUS S. MIDDLETON, *Primary Examiner.*